(12) United States Patent
Ouellette

(10) Patent No.: US 6,478,514 B1
(45) Date of Patent: Nov. 12, 2002

(54) NECK RING GUIDE CHANGE-OVER FOR AN AIR CONVEYOR

(75) Inventor: Joseph F. Ouellette, Glendale, MO (US)

(73) Assignee: Oullette Machinery Systems, Inc., Fenton ( * ) Notice: Subject to any disclaimer, the term of this patent is extended or adjusted under 35 U.S.C. 154(b) by 0 days.

(21) Appl. No.: 09/228,831

(22) Filed: Jan. 12, 1999

(51) Int. Cl.⁷ .............................................. B65G 53/16
(52) U.S. Cl. ......................................... 406/88; 406/86
(58) Field of Search ............................ 406/83, 86, 88, 406/84; 198/459.6, 463.4, 453

(56) References Cited

U.S. PATENT DOCUMENTS

| | | | | |
|---|---|---|---|---|
| 3,844,405 A | * | 10/1974 | Shuford | 198/836.3 |
| 4,724,947 A | * | 2/1988 | Opperthauser | 198/433 |
| 4,822,214 A | * | 4/1989 | Aidlin et al. | 406/86 |
| 5,147,153 A | * | 9/1992 | Aidlin et al. | 406/86 |
| 5,211,280 A | * | 5/1993 | Houde | 198/836.3 |
| 5,322,160 A | * | 6/1994 | Markiewicz et al. | 198/836.3 |
| 5,421,678 A | * | 6/1995 | Aidlin et al. | 406/88 |
| 5,628,605 A | * | 5/1997 | Miyoshi | 414/331 |
| 5,937,995 A | * | 8/1999 | Hartness et al. | 198/445 |
| 5,950,804 A | * | 9/1999 | Farkas | 198/626.1 |
| 6,024,518 A | * | 2/2000 | Ouellette | 406/88 |
| 6,062,773 A | * | 5/2000 | Ouellette | 406/88 |
| 6,109,426 A | * | 8/2000 | Messer, III | 198/817 |

FOREIGN PATENT DOCUMENTS

| | | | |
|---|---|---|---|
| EP | 0684197 A1 | * | 11/1995 |
| JP | 5246542 | * | 9/1993 |

OTHER PUBLICATIONS

Beverage World, Havis Dawson, Time to Change, Dec. 1994.*
Chilton's Food Engineering, Charles E. Morris, Profiles in Flexible Manufacturing, Nov. 1995.*
Beverage World, Hallie Forcinio, Get a Move on Productivity, Jan. 1999.*

* cited by examiner

Primary Examiner—Christopher P. Ellis
Assistant Examiner—Richard Ridley
(74) Attorney, Agent, or Firm—Thompson Coburn LLP

(57) ABSTRACT

A series of pneumatically controlled linear reciprocating actuators adjust the lateral spacing of a conveyor slot between opposed flanges of an air conveyor employed in conveying plastic bottles suspended by their neck rings in the conveyor slot to quickly change over the air conveyor for conveying plastic bottles of different neck and neck ring diameters.

13 Claims, 3 Drawing Sheets

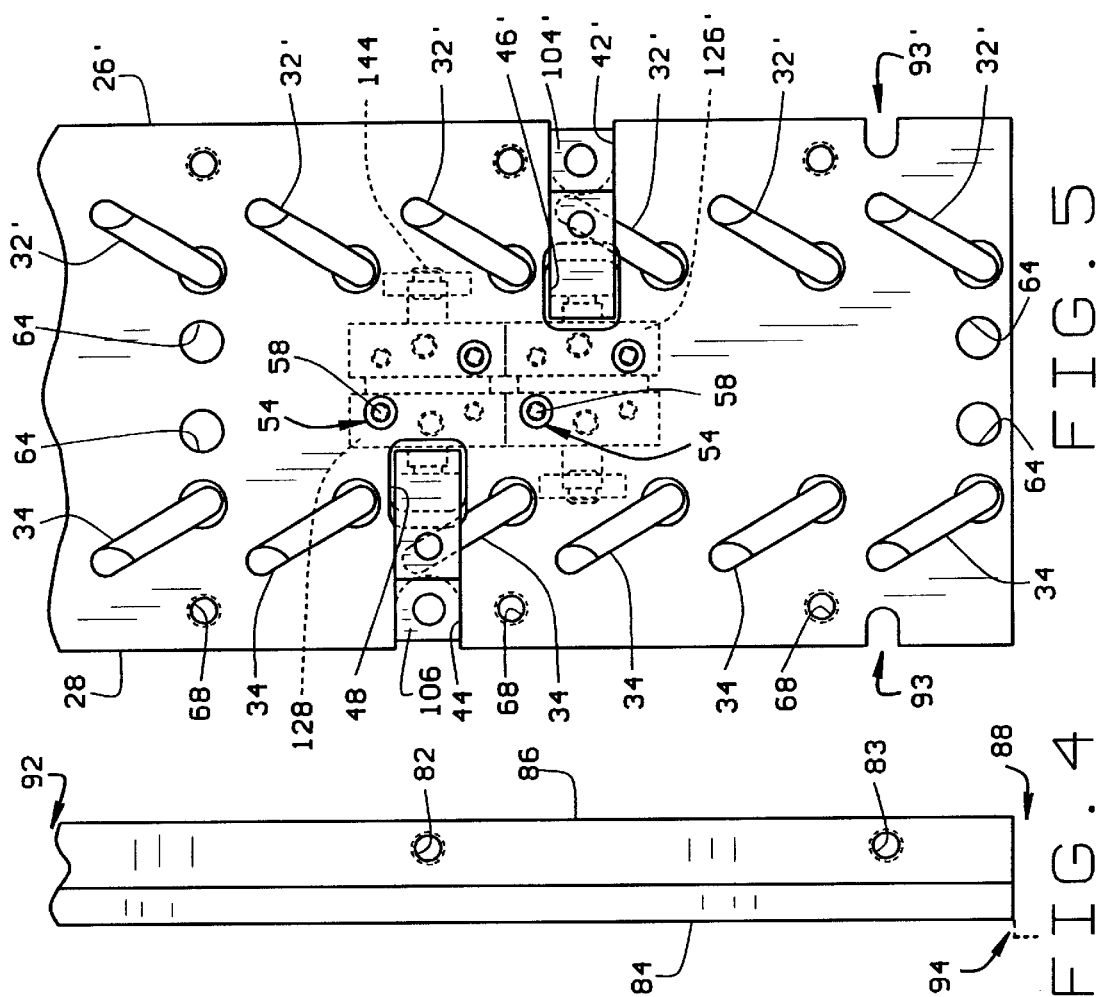
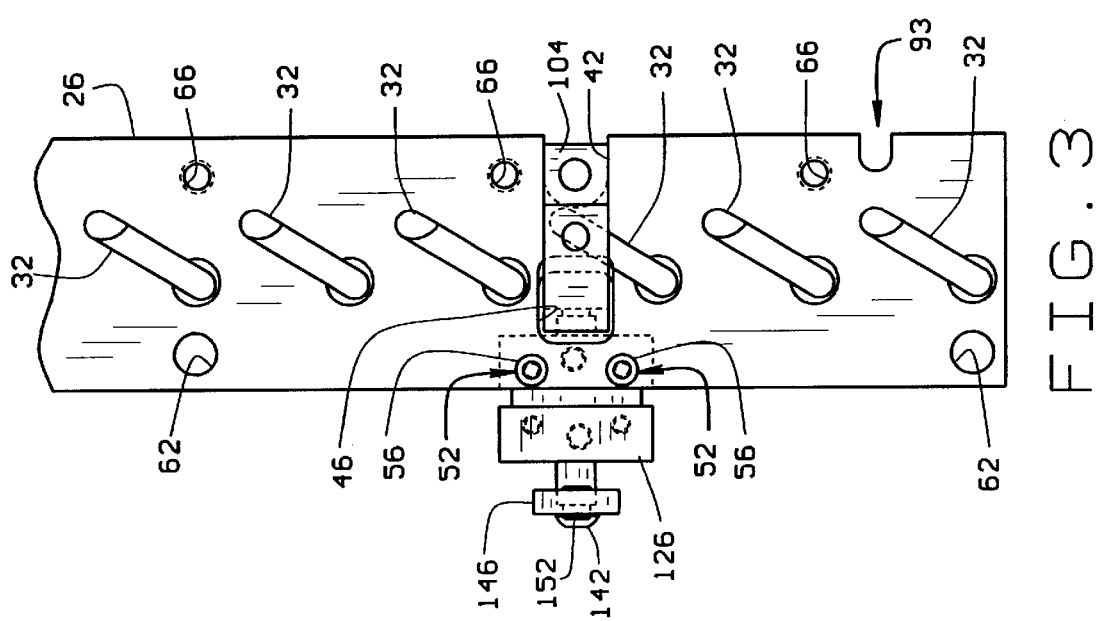

NECK RING GUIDE CHANGE-OVER FOR AN AIR CONVEYOR

BACKGROUND OF THE INVENTION

(1) Field of the Invention

The present invention pertains to an actuator mechanism that adjusts the lateral spacing between pairs of flanges that define a conveying slot of an air conveyor. In particular, the present invention provides a mechanism that can be selectively controlled to adjust the lateral spacing of the slot between opposed flanges of an air conveyor employed in conveying plastic bottles suspended by their neck rings in the slot to quickly change over the air conveyor for conveying plastic bottles of different neck and neck ring diameters.

(2) Description of the Related Art

Air conveyors are typically employed in the rapid transport of empty plastic bottles of the type having an annular rim or a neck ring at the base of the bottle neck. A typical air conveyor includes a pair of flanges that are spaced from each other defining an elongated slot between the flanges. For air conveyors of considerable longitudinal length, conveyor sections are connected end-to-end so that the pairs of flanges of one section are aligned with the pairs of flanges of other adjacent conveyor sections and the slots of the pairs of flanges aligned end-to-end define the conveyor path. The spacings between the flanges of the conveyor sections is sufficiently large to enable a portion of the bottle neck just below the neck ring to pass through the spacing with the bottle suspended from the top surfaces of the flanges by the neck ring engaging on the top surfaces. A series of air ducts are positioned along the flanges above and/or below the flanges. A plenum of the air conveyor sections supplies a flow of air to the air ducts. The air ducts are oriented so that air ejected from the ducts will contact the plastic bottles pushing the bottles along the pathway defined by the elongated slots of the aligned pairs of conveyor flanges with the neck rings of the bottles sliding along the top surfaces of the pairs of flanges. An example of this type of conveyor is disclosed in the Ouellette U.S. Pat. No. 5,628,588, issued May 13, 1997 and incorporated herein by reference.

In some types of air conveyors the opposed flanges that define the slot of the conveyor path are mounted in laterally spaced side walls of the air conveyor that define a conveying channel between the side walls. The air ducts also pass through these pairs of side walls feeding the flow of air to the jets that also emerge from these side walls. The side walls are provided with mutually opposed, longitudinally extending grooves. The pairs of flanges are mounted in these grooves. The grooves are designed to be sufficiently deep so that the flanges can be adjustably positioned in the grooves enabling the pair of opposed flanges to be moved laterally toward each other or laterally away from each other. This enables the lateral spacing between the pairs of flanges that defines the conveyor slot to be adjusted to accommodate different diameter neck rings of bottles to be conveyed through the conveyor, for example, an adjustment between the typical 28 mm thread diameter bottle neck and the 38 mm thread diameter bottle neck. The flanges are secured in the grooves in their relative adjusted positions by a series of set screws that are spacially arranged along the length of the conveyor channel side walls and are tightened down to secure the flanges in their adjusted positions in the opposed grooves of the side walls.

Although the ability to adjust the lateral spacing between the opposed flanges of an air conveyor is a very desirable feature in order to be able to use the same air conveyor in conveying plastic bottles of different neck diameters, the desirable flange lateral adjustment feature of this type of air conveyor has the disadvantage of the time required to adjust or change the lateral spacing between the flanges of each conveyor section. For each conveyor section the series of set screws along the lower sections of the conveyor channel side walls must first be loosened. Then, the opposed pairs of flanges are moved to their new adjusted positions and then each of the plurality of set screws in the opposed lower sections of the channel side walls along the longitudinal length of the conveyor section must be tightened down while the pair of opposed flanges are held in their new adjusted positions. This adjustment procedure is very time consuming for a single length of an air conveyor. The time involved in the adjustments can be multiplied several times for an air conveying system that is comprised of several sections of air conveyors. In addition, the adjustment procedures present an opportunity for human error where, for example, if the lateral spacing adjustment between a pair of flanges of a downstream section of the air conveyor system is incorrectly made smaller than the adjustment of the lateral spacing between the opposed flanges of an upstream section of the air conveyor system, the reduced spacing between the downstream section flanges can result in bottles becoming jammed at the transition between the upstream section and the downstream section resulting in more down time of the air conveyor system to correct the error.

What would overcome this disadvantage of the air conveyor having adjustable slot widths is a method of automatically and simultaneously changing over the lateral slot spacing between adjacent pairs of conveyor flanges between two previously determined and previously adjusted lateral slot spacings thereby eliminating the substantial amount of conveyor down time presently needed for such an adjustment. In addition, by enabling the change over of the lateral slot spacing between two previously adjusted spacing distances, the potential for human error that is present each time the lateral slot spacing is adjusted manually is also eliminated.

SUMMARY OF THE INVENTION

The present invention overcomes the disadvantages described above by providing a mechanism for quickly changing over the lateral spacing width between pairs of opposed flanges of one or more air conveyor sections between two previously determined and previously adjusted spacing distances, for example the lateral spacing distances that accommodate both the typical 28 mm thread diameter plastic bottle and the 38 mm thread diameter plastic bottle. The flange slot lateral spacing change over mechanism can be employed in newly manufactured air conveyor sections and can also be retrofit to air conveyor sections such as that disclosed in the previously referenced U.S. Pat. No. 5,628,588 as well as other types of air conveyors.

The change over mechanism of the invention employs air channel lower side wall sections that are similar to but replace lower side wall sections of the type disclosed in the above-referenced patent. The lower side wall sections, when connected to the side walls of the air conveyor channel, define mutually opposed grooves in which the adjustable flanges are received just as in the prior art air conveyor. The mutually opposed pairs of flanges of each air conveyor section are received in the mutually opposed grooves with the grooves being dimensioned sufficiently large to enable the opposed pairs of flanges to easily slide in the grooves laterally toward and away from each other. However, the pairs of flanges differ from the prior art flanges in that a series of longitudinally spaced, internally threaded holes pass through the flanges between their top and bottom surfaces.

A plurality of L-shaped brackets are mounted in lateral notches in both lower side wall sections of the air conveyor channel for laterally reciprocating movement toward and away from each other. Each of the L-shaped brackets has a horizontally extending arm that is connected to the underside of each of the opposed flanges by a screw threaded into one of the internally threaded screw holes of the flanges. A downwardly depending leg of each of the brackets passes through the bottoms of the side wall lower sections.

A plurality of actuator mechanisms, equal in number to the brackets, are secured in longitudinally spaced positions along the undersides of each of the air channel side wall lower sections. Each of the actuators includes a piston housing and a laterally reciprocating double-acting piston contained in the housing. Each piston has an inboard rod end projecting from an inboard side of the piston housing facing the slot of the air conveyor and an outboard rod end projecting from an outboard side of the piston housing facing away from the slot of the air conveyor. The downwardly depending legs of the brackets are connected to the inboard rod ends of the pistons. The pistons are mounted in the piston housings for laterally reciprocating movement between first and second positions of the pistons relative to the housing. The reciprocating movement of pistons to their first positions of the pistons moves the brackets attached to the pistons and the opposed flanges attached to the brackets laterally inwardly toward each other, positioning the flanges in their first relative positions. In the first relative positions of the flanges the first lateral spacing or slot width between the flanges is the smaller of the two predetermined lateral spacings between the pair of flanges. On reciprocating movement of the pistons to their second positions, the brackets attached to the pistons are moved laterally away from each other causing the flanges attached to the brackets to also move laterally away from each other to their second relative positions. In the second relative positions of the flanges, the second lateral spacing between the opposed pair of flanges is the larger of the two predetermined lateral spacings between the flanges.

The opposing inboard and outboard rod ends of each piston of each actuator mechanism have an adjustment mechanism. On the inboard piston rod end, the adjustment mechanism is a set screw screw-threaded in the downwardly depending leg of the bracket attached to the inboard piston rod end. By turning the set screw into and out or the downwardly depending leg of the bracket, the relative position of the inboard piston rod end to the piston housing when the piston is moved to its second position relative to the housing can be adjusted. An arm is attached to the opposite outboard rod end of the piston and an additional set screw is screw-threaded into the arm. By turning the set screw into and out of the arm, the position of the outboard piston rod end relative to the piston housing when the piston is moved to its first position relative to the housing can be adjusted.

Each of the double-acting piston actuator mechanisms is connected with a pneumatic circuit that selectively supplies pneumatic pressure to the actuator through two separate supply lines. When pneumatic pressure is supplied through the first supply line, the piston of each actuator is moved to its first position relative to the piston housing. When the pneumatic pressure is supplied to the piston actuators through the second supply line, the piston of each actuator is moved to its second position relative to the piston housing. In this manner, the opposed flanges of the air conveyor can be selectively and simultaneously moved between their first and second lateral spacing positions by the control of pneumatic pressure supplied to the piston actuators.

Where a series of air conveyors of the type described above are connected together end-to-end, it is often desirable to position the upstream ends of each opposed pair of flanges of the air conveyor sections at a slightly greater distance therebetween than the downstream ends when the opposed flanges are moved to both their first and second lateral spacing positions. This ensures that the lateral spacing between the pair of flanges of an upstream conveyor section will be slightly smaller than the lateral spacing between the pair of flanges of a downstream air conveyor section in both adjusted positions of the pairs of flanges for the two sections of air conveyor. This "toe-in/toe-out" arrangement of the adjacent pairs of flanges in the sequential conveyor sections prevents the potential for bottle necks and rings being nicked or scratched in the transition of the upstream air conveyor flanges to the downstream air conveyor flanges. However, the toe-in/toe-out arrangement of adjacent pairs of flanges is not necessary in the operation of the invention and it is preferable that the flanges are adjusted to positions where there is a smooth transition from the upstream pair of flanges to the downstream pair of flanges.

The lateral slot spacing adjustment of the air conveyor may be employed in single conveyor path air conveyors and may also be employed in multiple conveyor path air conveyors where the multiple of conveyor paths extend side-by-side with each other.

BRIEF DESCRIPTION OF THE DRAWINGS

Further objects and features of the present invention will be revealed in the following detailed description of the preferred embodiment of the invention and in the drawing figures where:

FIG. 3 is a partial, top plan view taken along the line 3—3 of FIG. 2;

FIG. 4 is a partial, top plan view of one flange of the change over apparatus; and FIG. 5 is a partial, top plan view taken along the line 5—5 of FIG. 2.

DETAILED DESCRIPTION OF THE PREFERRED EMBODIMENTS

Figure 1:
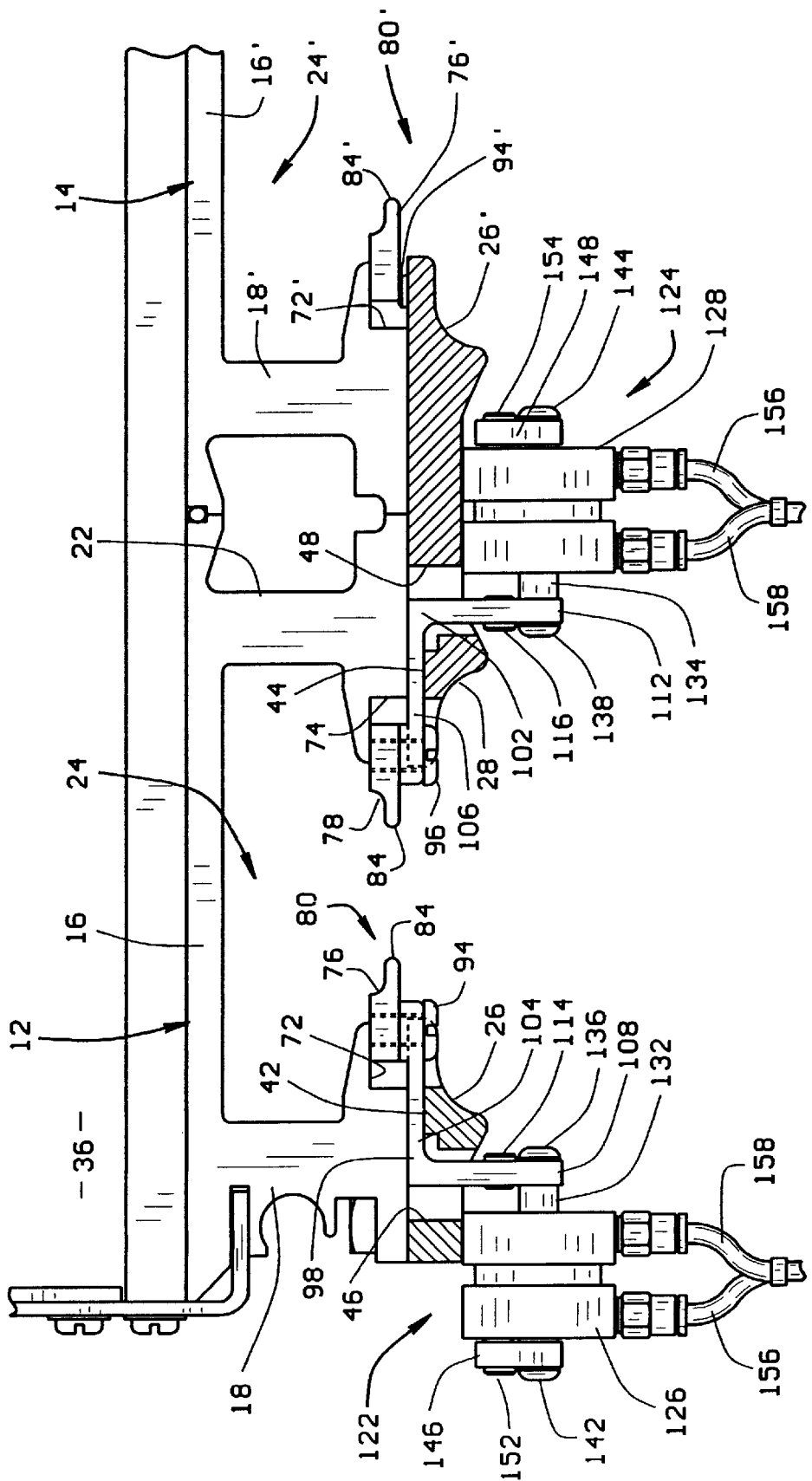
FIG. 1 is an end elevation view of the flange slot lateral spacing change over apparatus of the invention showing the opposed pair of flanges adjusted to their first, smaller lateral spacing.
Figure 2:
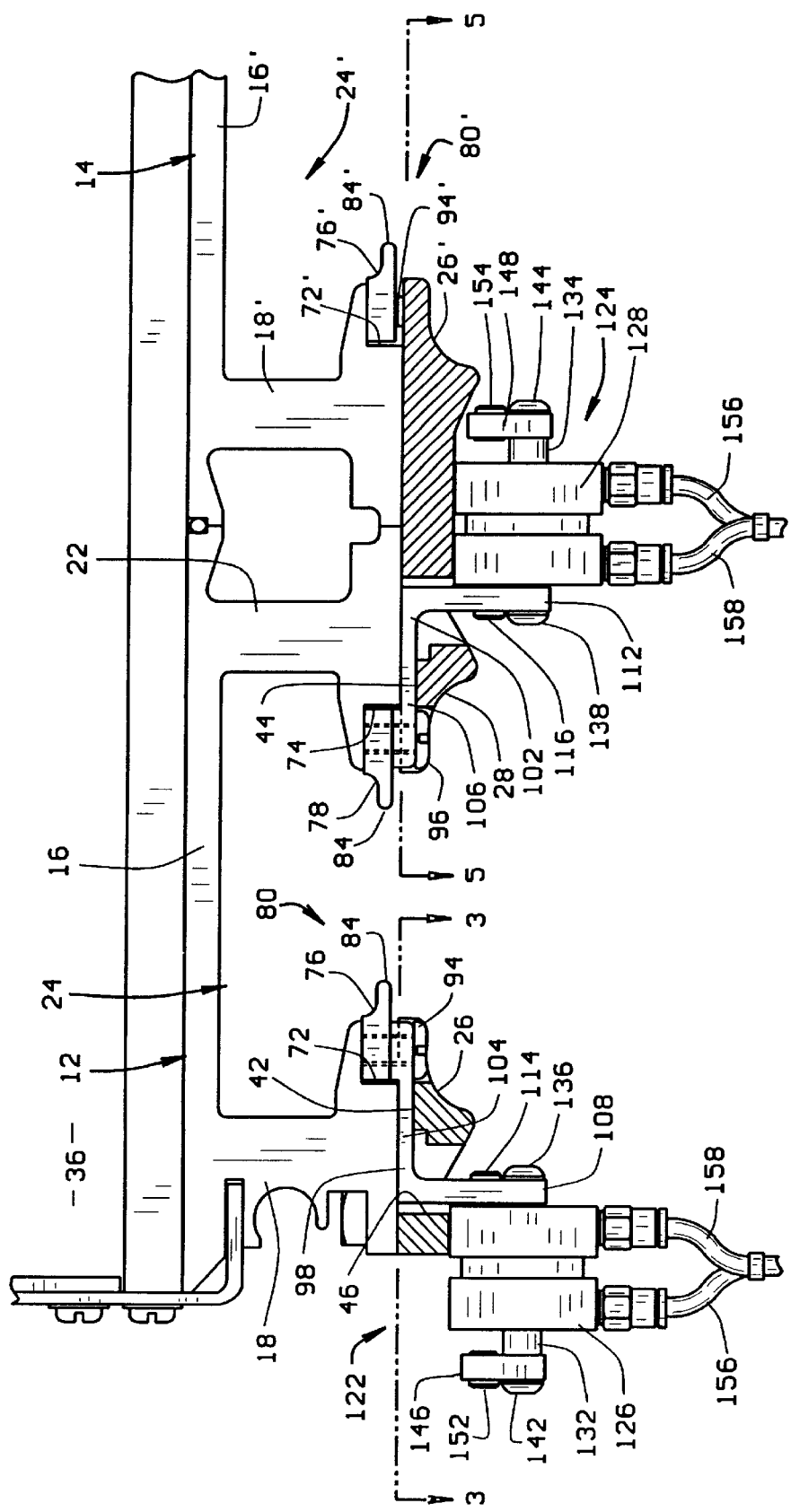
FIG. 2 is an end elevation view similar to that of FIG. 1 showing the opposed pair of flanges adjusted to their second, larger lateral spacing.

FIGS. 1 and 2 show a multi-channel air conveyor that serves as the operative environment of the present invention. Although a multi-channel air conveyor is shown, it should be understood that the present invention may be employed with a single-channel air conveyor. FIGS. 1 and 2 show end elevation views of the air conveyor showing one complete air conveyor channel 12 and a partial view of a second air conveyor channel 14. To simplify the description of the invention, the air conveyor neck ring guide change over apparatus will only be described in detail with reference to the first air conveyor channel 12. From this description it will be apparent how the change over apparatus may be employed on multi-channel air conveyors.

FIGS. 1 and 2 show end views of air conveyor channels 12, 14 that are similar in construction to the air conveyor disclosed in the Ouelette U.S. Pat. No. 5,628,588, referenced earlier. Because the construction of the air conveyor channels is set forth in the above-referenced patent, the construction of the air conveyor channel 12 will only be generally described here. The conveyor channel 12 includes a top wall 16 and laterally spaced side walls 18, 22. Together, the top wall 16 and side walls 18, 22 give the air conveyor channel a generally inverted U-shaped configuration surrounding an interior volume 24 of the conveyor channel. The side walls 18, 22 of the conveyor channel 12 have lower sections 26, 28, respectively. The lower sections 26, 28 are connected to the bottoms of the side walls 18, 22 by threaded fasteners (not shown). The lower sections 26, 28 of the side walls have pluralities of air duct outlets 32, 34 (see FIGS. 3 and 5) that pass through the side wall lower sections. The air duct outlets 32, 34 of the lower side wall sections communicate with air ducts (not shown) that pass through the side walls 18, 22 of the air conveyor channel. The air ducts are fed with an air flow supplied through a plenum 36 above the air conveyor channel 12. The air flow through the plenum 36 passes through the ducts of the side walls 18, 22 (not shown) and then passes through the air ducts 32, 34 of the side wall lower sections 26, 28. The outlets of the air ducts 32, 34 direct jets of air generally laterally toward the center of the air conveyor channel 12 where they will strike bottle containers conveyed by the air conveyor channel in the area of the shoulders of the bottles, thereby forcing the bottles to travel downstream along the length of the air conveyor. This construction of the air ducts is employed in air conveyors of the type disclosed in the above-referenced U.S. Pat. No. 5,628,588.

The construction of the air conveyor channel lower side wall sections 26, 28 described above is similar to that of the above-referenced patent except for the presence of laterally extending notches 42, 44 formed in the inboard edges or mutually opposed edges of the lower side wall sections. These notches are shown in FIGS. 3 and 5. The notches 42, 44 also have downwardly depending holes 46, 48, respectively, at their outboard ends. These holes 46, 48 can be seen in FIGS. 1–3 and 5. The notches and their holes are formed in the conveyor side wall lower sections 26, 28 at spaced positions along the longitudinal lengths of the side wall lower sections. As illustrated in FIGS. 3 and 5, it is not necessary that the notches and their holes be positioned laterally opposite each other.

In addition to the lateral notches 42, 44 and their holes 46, 48, the side wall lower sections 26, 28 are provided with additional fastener holes 52, 54 to receive screw-threaded fasteners 56, 58 in attaching actuator mechanisms (yet to be described) to the undersides of the side wall lower sections. As shown in FIGS. 3 and 5, the side wall lower sections 26, 28 are provided with holes 62, 64 to receive fasteners for attachment of the lower sections to the respective air conveyor channel side walls 18, 22 and with set screw holes 66, 68 that are employed in vertically positioning the air conveyor flanges as will be explained.

The side wall lower sections 26, 28 are attached to the air conveyor channel side walls 18, 22 by threaded fasteners inserted through their respective fastener holes 62, 64 as is done in the prior art air conveyor channel. With the side wall lower sections attached to the air conveyor side walls, a pair of mutually opposed, longitudinally extending grooves 72, 74 are defined between the side walls and their lower sections. The grooves 72, 74 receive the respective, mutually opposed flanges 76, 78 of the air conveyor channel in the same manner as prior art air conveyors with a longitudinal slot 80 defined between the flanges. However, the flanges 76, 78 are not fixed in adjusted positions in the grooves 72, 74 by set screws as was done in the prior art air conveyor. Instead, the flanges 76, 78 are free to slide laterally in their respective grooves 72, 74 toward and away from each other on rounded ends of set screws threaded into the set screw holes 66, 68 of the side wall lower sections 26, 28.

One representative flange 78 is shown in FIG. 4, it being understood that the other flange 76 is basically the same as the one shown. The flanges 76, 78 are similar to prior art flanges except that they are provided with two sets of holes 82, 83. The holes of both sets 82, 83 are internally screw-threaded holes. The flange has opposite interior 84 and exterior 86 edges as well as an upstream end 88 and a downstream end 92 that is shown broken away in FIG. 4. What is meant by upstream and downstream ends is that the flange would be positioned in the air conveyor channel 12 where the flow of bottles proceeds in a downstream direction from the flange upstream end 88 toward the downstream end 92.

A plurality of set screws (not shown) screw threaded into one set of the flange holes 83 and a plurality of set screws (not shown) screw threaded into the set screw holes 66, 68 of the side wall lower sections 26, 28, respectively, are used in vertically positioning the flanges 76, 78 in their respective grooves 72, 74. The vertical position of both flanges is adjusted in the same way so only the adjustment of the right hand flange 78 as shown in FIGS. 1 and 2 will be described. Referring to FIGS. 4 and 5, with the flange 78 loosely inserted into its respective groove 74, a plurality of set screws are screw threaded into the one set of flange holes 83 from the underside of the flange as viewed in FIG. 4. (Although only one hole 83 is shown in the flange, there are at least two holes 83 adjacent the upstream and downstream ends of the flange and there may be additional holes 83 spacially arranged between these two). The other set of flange holes 82 are employed in connecting the flange to actuator brackets which will be described later. The side wall lower section 28 is provided with notches 93 that correspond in position to the set screw holes 83 of the flange 78 and provide access to the set screws from beneath the side wall lower section 28. An additional set of set screws is screw threaded into the set screw holes 68 of the side wall lower section 28 from beneath the side wall lower section as viewed in FIG. 5. With the flange 78 positioned in its groove 74 and with the set screws partially threaded into the set screw holes 68 of the side wall lower section 28 and into the one set of holes 83 of the flange 78, the vertical position of the flange 78 in the groove 74 can be adjusted. By accessing the set screws in the flange holes 83 through the notches 93 of the lower side wall section and turning the set screws clockwise into the flange, the rounded distal end of the set screws will contact the top surface of the side wall groove 74. This will push the flange 78 downwardly in the groove 74. By turning the set screws that have been threaded into the set screw holes 68 of the lower side wall section 28 in a clockwise direction, the rounded distal ends of the set screws will move up against the underside of the flange 78 pushing the flange upwardly in the groove 74. Thus, it can be seen that by turning the set screws in the one set of flange holes 83 and in the side wall lower section holes 68 in opposite clockwise and counterclockwise directions, the vertical position of the flange 78 in the groove 74 can be adjusted. These adjustments in the vertical position of the flange 78 in its groove 74 are very slight. In addition, the set screws threaded into the flange holes 83 and side wall lower section holes 68 are not turned to the extent that they would hinder the lateral sliding movement of the flange 78 in the groove 74.

The vertical positioning of the flange 78 in its groove 74 is useful in adjusting the adjacent ends of pairs of flanges arranged in a series along the length of an air conveyor. Where pairs of flanges defining the conveying slot 80 of the air conveyor are arranged end-to-end along the longitudinal length of the conveyor, it is desirable that the transition between the downstream ends of one pair of flanges to the upstream ends of the next pair of flanges in the conveyor sequence be as smooth as possible. Ideally, the top surfaces of adjacent pairs of flanges across which the neck rings of conveyed plastic bottles slide would be adjustably positioned vertically adjacent each other so that the top surfaces of the two pairs of end-to-end flanges define a smooth, continuous surface across the transition between the ends of the two pairs of flanges. However, at times it is difficult to adjustably position adjacent pairs of flanges in this manner. Therefore, the vertical adjustment of the flanges provided by the set screws in the flange holes 9S and in the side wall lower section holes 68 enables positioning the ends of the upstream pair of flanges slightly above the adjacent ends of the downstream pair of flanges, creating a stepped down or toe-up/toe-down relative positioning of the two pairs of flanges. As a plastic bottle is conveyed across this transition between the two pairs of flanges, its neck ring slides along the surfaces of the upstream pair of flanges, across the transition and then down onto the top surfaces of the downstream pair of flanges. This stepped down or toe-up/toe-down arrangement of the pairs of flanges prevents any projecting obstruction between the adjacent pairs of flanges that could possibly nick or scratch the surface of the plastic bottle as it is conveyed across the transition between the pairs of flanges.

With the pairs of flanges 76, 78 positioned in their respective grooves 72, 74, the flanges are secured by screws 94, 96 to L-shaped brackets 98, 102 positioned in each of the lateral notches 42, 44 of the conveyor channel side wall lower sections 26, 28. As shown in FIGS. 1 and 2, each bracket 98, 102 has a horizontally extending arm 104, 106 that is received in sliding engagement in the lateral notches 42, 44 of the lower side wall sections. Each bracket also has a downwardly depending leg 108, 112 that passes through the respective notch holes 46, 48 of the lateral notches. As seen in FIGS. 1 and 2, the notch holes 46, 48 have lateral widths dimensioned sufficiently large to enable the pair of brackets 98, 102 to slide freely in the notches 42, 44 laterally toward and away from each other. The lateral sliding movement of the brackets 98, 102 is transferred to their respective flanges 76, 78. Each of the bracket downwardly depending legs 108, 112 has a respective adjustment set screw 114, 116 that is employed in adjusting the lateral movement of the brackets as will be explained.

A plurality of actuator mechanisms 122, 124, equal in number to the brackets 98, 102, are secured in longitudinally spaced positions along the undersides of each of the air conveyor channel side wall lower sections 26, 28 by threaded fasteners 56, 58. Each of the actuators includes a piston housing 126, 128 and a laterally reciprocating double-acting piston 132, 134 contained in the respective housings. The actuator mechanisms 124 are of the type offered by Bimba Manufacturing Co. of Monee, Ill. and sold under the registered trademark "BIMBA". Each piston has an inboard rod end with an attached screw threaded fastener 136, 138 projecting from an inboard side of the piston housing 126, 128 that faces the slot 80 of the air conveyor, and an opposite outboard rod end with an attached screw threaded fastener 142, 144 projecting from an outboard side of the respective piston housings 126, 128 that faces away from the slot 80 of the air conveyor. The fasteners 136, 138 on the inboard rod ends secure the brackets 98, 102 to the piston rods 132, 134. The fasteners 142, 144 on the outboard rod ends secure arms to the piston rods that will be described later. The pistons 132, 134 are mounted in their respective piston housings 126, 128 for laterally reciprocating movement between first and second positions of the pistons relative to their housings and relative to each other. The reciprocating movement of the pistons 132, 134 laterally toward each other to their first relative positions shown in FIG. 1 moves the brackets 98, 102 attached to their respective pistons and the opposed flanges 76, 78 attached to the respective brackets laterally inwardly toward each other positioning the flanges in their first relative positions shown in FIG. 1. In the first relative positions of the flanges 76, 78 the first lateral spacing or slot width between the flanges is the smaller of the two predetermined lateral spacings between the pair of flanges. The reciprocating movement of the pistons 132, 134 laterally away from each other to their second relative positions moves the respective brackets 98, 102 attached to the pistons laterally away from each other and moves the opposed flanges 76, 78 attached to the brackets laterally away from each other positioning the flanges in their second relative positions shown in FIG. 2. In the second relative positions of the flanges 76, 78 the second lateral spacing or slot width between the flanges is the larger of the two predetermined lateral spacings between the pair of flanges.

The opposite inboard and outboard rod ends of each piston of each actuator mechanism has an adjustment mechanism. As mentioned earlier, on the inboard piston rod ends the adjustment mechanism is provided by the respective set screws 114, 116 that are threaded into mating threaded holes in the respective downwardly depending legs 108, 112 of the brackets. It can be seen that by turning these set screws 114, 116 into their respective legs 108, 112, the extent to which the set screw projects from the leg into the spacing between the leg and the inboard side of the respective piston housings 126, 128 will limit the extent that the brackets 98, 102 can move laterally away from each other. This, in turn, sets the lateral spacing between the opposed flanges 76, 78 when they are moved to their second relative positions by the actuator mechanisms 122, 124. In addition, by adjustment of the set screws 114, 116 of the sequentially arranged brackets along the longitudinal length of the air conveyor channel, the lateral spacing between the flanges at their upstream ends 88 can be made slightly larger than the lateral spacing between the flanges at their downstream ends 92. Thus, a slightly tapered configuration of the slot 80 in each air conveyor section can be achieved.

The tapered configuration of the slot 8C is so very slight that it will not affect the free travel. of a bottle container neck through the opposed pair of flanges. However, the slight tapered configuration of the slot does result in a stepped or toe-in/toe-out arrangement of pairs of flanges of consecutively arranged air conveyor sections as represented by the dashed lines 94 in FIG. 4. This inwardly stepped arrangement at the transition area from the downstream end of one pair of mutually opposed flanges to the upstream end of the next pair of mutually opposed flanges in the sequence of air conveyor sections ensures that the travel of bottles through the two aligned air conveyor sections will not nick or scratch the bottles that travel across the transition between the downstream flange ends of an upstream air conveyor section onto the upstream flange ends of a downstream air conveyor section.

Arms 146, 148 are secured on the respective outboard rod ends of the double-acting pistons by the piston rod fasteners 142, 144. Adjustment set screws 152, 154 are screw threaded into mating holes in the respective arms. These set screws 152, 154 are adjustably positioned in their respective arms in the same manner as the set screws of the brackets to adjust the lateral movement of the double-acting pistons 132, 134 laterally toward each other. For example, the extent to which the set screws 152, 154 project into the spacing between the respective arms 146, 148 and the outboard sides of the actuator mechanisms 122, 124 adjusts the lateral spacing between the pair of flanges 76, 78 when the flanges are moved to their first relative positions with the first lateral spacing between the flanges. Again, the adjusted positions of the set screws 152, 154 may also be employed to set the desired tapered configuration of the slot 80 defined between the flanges 76, 78 in their first relative positions to achieve the stepped positioning of pairs of flanges in consecutively arranged air conveyor sections.

Each of the double-acting piston actuator mechanisms 122, 124 is connected to a pneumatic circuit that selectively supplies pneumatic pressure to the actuators through two separate supply lines 156, 158, as is conventional in the operation of double-acting piston actuators of this type. When pneumatic pressure is supplied through the first supply line 156, the piston rods 132, 134 of the actuators move to their first relative positions shown in FIG. 1. When the pneumatic pressure is supplied to the second supply line 158, the pistons 132, 134 of each actuator are moved to their second relative positions shown in FIG. 2. In this manner, the opposed flanges 76, 78 of the air conveyor can be selectively and simultaneously moved between their first and second relative positions with the respective first and second lateral spacings of the conveyor slot between the flanges by the control of pneumatic pressure supplied to the actuator mechanisms.

As explained earlier, where a series of air conveyors of the type described above are connected together end-to-end, the upstream ends of each opposed pair of flanges of the air conveyor sections can be adjusted to have a greater distance therebetween than the downstream ends when the opposed flanges are moved between both their first and second lateral spacing positions. This can be accomplished by setting the required adjustments of the adjustment set screws at the opposite ends of each piston. This ensures that the lateral spacing between the downstream ends of the flanges of an upstream conveyor section will be smaller than the lateral spacing between the upstream ends of the flanges of a downstream air conveyor section in both adjusted positions of the pairs of flanges for the two sections of the air conveyor. This "stepped" arrangement of the pairs of flanges in the sequential conveyor sections prevents the potential for bottles being nicked or scratched in the transition section of the upstream air conveyor to the downstream air conveyor.

As explained earlier, although the lateral slot spacing adjustment of the air conveyor described above is described with reference to only a single air conveyor channel 12, it may also be employed in multiple-channel air conveyors as represented to the left of drawing FIGS. 1, 2 and 5. In this second channel 14, the same reference numbers employed in labeling component parts of the first channel 12 are employed in component parts of the second channel 14 but are followed by a prime ('). In addition, although pneumatic double-acting piston actuators are employed in the above-described embodiment of the invention, other types of linear actuators may be employed to move the opposed pair of flanges between their laterally spaced positions, for example, solenoid operated actuators or screw thread and recirculating ball type linear actuators.

While the present invention has been described by reference to a specific embodiment, it should be understood that modifications and variations of the invention may be constructed without departing form the scope of the invention defined in the following claims.

What is claimed is:

1. A longitudinally extending conveyor having a longitudinally extending conveyor path, the conveyor comprising:

a pair of longitudinally extending flanges having a first lateral spacing between the pair of flanges, the lateral spacing defining a longitudinally extending slot of the conveyor path;

an actuator mechanism connected to at least one flange of the pair of flanges, the actuator mechanism being operable to move the one flange between first and second positions of the one flange relative to the other flange of the pair of flanges where in the first position the one flange is at a first lateral spacing from the other flange and in the second position the one flange is at a second lateral spacing from the other flange, the first lateral spacing being different from the second lateral spacing;

the actuator mechanism is adjustable to adjust a size of the first and second lateral spacings between the one flange and the other flange of the pair of flanges; and, an actuator mechanism is connected to each of the one flange and the other flange of the pair and is operable to move the pair of flanges laterally toward and away from each other.

2. The conveyor of claim 1, wherein:

the actuator mechanism is one of two double acting pistons with the double acting piston being connected to the one flange of the pair of flanges and another double acting piston being connected to the other flange of the pair of flanges.

3. The conveyor of claim 2, wherein:

a control circuit interconnects the actuator mechanisms and controls the one flange and the other flange of the pair to move simultaneously toward each other and to move simultaneously away from each other.

4. The conveyor of claim 3, wherein:

the control circuit and the double-acting pistons are pneumatic.

5. A longitudinally extending conveyor having a longitudinally extending conveyor path, the conveyor comprising:

a pair of longitudinally extending flanges having a first lateral spacing between the pair of flanges, the lateral spacing defining a longitudinally extending slot of the conveyor path;

an actuator mechanism connected to at least one flange of the pair of flanges, the actuator mechanism being operable to move the one flange between first and second positions of the one flange relative to the other flange of the pair of flanges where in the first position the one flange is at a first lateral spacing from the other flange and in the second position the one flange is at a second lateral spacing from the other flange, the first lateral spacing being different from the second lateral spacing, and the pair of longitudinally extending flanges have longitudinally opposite upstream and downstream ends and the upstream ends of the flanges are a greater lateral distance apart than the downstream ends of the flanges during both the first and second lateral spacings between the pair of flanges.

6. The conveyor of claim 5 wherein:

the pair of flanges are one pair of a series of like pairs of flanges arranged end-to-end along the longitudinally extending conveyor.

7. A longitudinally extending conveyor having a longitudinally extending conveyor path, the conveyor comprising:

a plurality of like pairs of longitudinally extending flanges arranged end-to-end along the longitudinally extending conveyor, each pair of flanges has a lateral spacing therebetween and together the lateral spacings between the pairs of flanges define a longitudinally extending slot of the conveyor path, each pair of flanges has longitudinally opposite upstream and downstream ends and the upstream ends of the pairs of flanges are a greater lateral distance apart than the downstream ends of the pairs of flanges;

a mechanism supports the pairs of flanges with their lateral spacings therebetween and the mechanism is adjustable for changing the lateral spacing between the flanges; and the mechanism includes a plurality of actuators with each actuator connected to at least one flange of each pair of flanges, each actuator is operable to move the one flange between first and second positions of the one flange relative to the other flange of each pair of flanges where in the first position the first flange is at a first lateral spacing from the other flange and in the second position the one flange is at a second lateral spacing from the other flange, the first lateral spacing being different from the second lateral spacing.

8. The conveyor of claim 7, wherein:

each actuator includes a double-acting piston connected to the one flange of each pair of flanges, the piston is mounted in a piston housing for reciprocating movement between first and second positions of the piston relative to the piston housing, and the piston moves the one flange to its first position in response to the piston being moved to its first position and the piston moves the one flange to its second position in response to the piston being moved to its second position.

9. The conveyor of claim 8, wherein:

each actuator includes an adjustment mechanism that adjusts the relative positions of the piston and its piston housing in the first and second positions of the piston relative to its piston housing and thereby adjusts the lateral spacing of the one flange relative to the other flange of each pair of flanges in the first and second lateral spacings of the one flange from the other flange of each pair.

10. The conveyor of claim 7, wherein:

an actuator mechanism is connected to each of the one flange and the other flange of each pair of flanges and the actuators are operable to move each pair of flanges laterally toward each other and away from each other.

11. The conveyor of claim 10, wherein:

the actuators include double-acting pistons connected to the one flange and the other flange of each pair of flanges.

12. The conveyor of claim 10, wherein:

a control circuit interconnects the actuator mechanisms and controls the one flange and the other flange of the pair to move simultaneously toward each other and to move simultaneously away from each other.

13. The conveyor of claim 7, wherein:

each actuator is adjustable to adjust a size of the first and second lateral spacings between the one flange and the other flange of the pair of flanges.

\* \* \* \* \*